US008914505B2

(12) United States Patent
Altshuler et al.

(10) Patent No.: US 8,914,505 B2
(45) Date of Patent: Dec. 16, 2014

(54) METHODS AND APPARATUS FOR TUNING A NETWORK FOR OPTIMAL PERFORMANCE

(71) Applicant: Massachusetts Institute of Technology, Cambridge, MA (US)

(72) Inventors: Yaniv Altshuler, Ramat Yishai (IL); Alex Paul Pentland, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 139 days.

(21) Appl. No.: 13/866,556

(22) Filed: Apr. 19, 2013

(65) Prior Publication Data

US 2013/0297781 A1   Nov. 7, 2013

Related U.S. Application Data

(60) Provisional application No. 61/635,833, filed on Apr. 19, 2012, provisional application No. 61/794,218, filed on Mar. 15, 2013.

(51) Int. Cl.
*G06F 15/173* (2006.01)
*G06F 9/44* (2006.01)
*H04L 12/24* (2006.01)

(52) U.S. Cl.
CPC .............. *H04L 41/12* (2013.01); *H04L 41/083* (2013.01); *H04L 41/145* (2013.01)
USPC ............................................. 709/224; 706/52

(58) Field of Classification Search
CPC ....... H04L 43/08; H04L 41/12; H04L 41/083; H04L 41/0816; H04L 43/0817; H04L 41/145; G06N 7/02; G06Q 50/01
USPC ............................................. 709/224; 706/52
See application file for complete search history.

(56) References Cited

U.S. PATENT DOCUMENTS

2008/0320131 A1*  12/2008  Chalmers et al. ............. 709/224
2010/0185630 A1    7/2010   Cheng et al.
(Continued)

OTHER PUBLICATIONS

Aharony, N., Pan, W., IP, C. Khayal, I., Pentland, A., Sep. 25, 2011, Social fmri: Investigating and shaping social mechanisms in the real world. Pervasive and Mobile Computing, vol. 7, Issue 6, pp. 643-659, Elsevier Sep. 25, 2011.

(Continued)

*Primary Examiner* — Wing F Chan
*Assistant Examiner* — Zia Haq
(74) *Attorney, Agent, or Firm* — Stephen R. Otis

(57) ABSTRACT

In exemplary implementations of this invention, one or more computer processors receive electronic data indicative of, or compute (i) at least three different topologies of a network and (ii) a level of network performance of a task for each of the different topologies, respectively. The processors also calculate (i) a cascade probability for each of the different topologies, respectively, (ii) a curve indicative of correlation between the cascade probabilities and levels of network performance, and (iii) an optimal cascade probability which optimizes the level of network performance. A topological change in the network is produced (or its likelihood is increased). The topological change makes or would make the cascade probability closer to the optimal cascade probability. The processors output control signals (i) to make the topological change or (ii) to communicate an incentive for the topological change to an electronic node device in the network.

19 Claims, 7 Drawing Sheets

(56) References Cited

U.S. PATENT DOCUMENTS

| | | | |
|---|---|---|---|
| 2010/0198757 A1 | 8/2010 | Cheng et al. | |
| 2012/0259915 A1 | 10/2012 | Bhatt et al. | |
| 2012/0303573 A1* | 11/2012 | Pan et al. | 706/52 |
| 2013/0124448 A1* | 5/2013 | Soulie-Fogelman | 706/52 |

OTHER PUBLICATIONS

Huberman, B., Romero, D. , Wu, F., 2009, Social networks that matter: Twitter under the microscope. First Monday, vol. 14, No. 1, Jan. 5, 2009.

Choi, H., Kim, S., Lee, J., 2010, Role of network structure and network effects in diffusion of innovations. Industrial Marketing Management vol. 39, pp. 170-177, Elsevier, 2010.

Neosia, V., Bagnoli, F., Latora, V., Jun. 22 2010, Impact of network structure on a model of diffusion and competitive interaction. arXiv:1006.4257v1 Jun. 22 2010.

Kempe, D., Kleinberg, J., Tardos, E., 2003, Maximizing the spread of influence through a social network. Proceeding KDD '03 Proceedings of the ninth ACM SIGKDD international conference on Knowledge discovery and data mining, pp. 137-14, ACM Press, New York, NY, USA, 2003.

Shah, D., Zaman, T., 2010, Rumors in a network: Who's the culprit?, Arxiv preprint arXiv:0909.4370v2 Oct. 29, 2010.

Bakshy, E., Hofman, J., Mason, W., Watts, D., Feb. 2011, Everyone's an influencer: quantifying influence on twitter. WSDM '11 Proceedings of the fourth ACM international conference on Web search and data mining, pp. 65-74, ACM Press, New York, NY, USA, Feb. 2011.

Watts, D., Peretti, J., 2007, Viral marketing for the real world. Harvard Business Review, May 2007, p. 22.

Centola, D., Macy, M., 2007, Complex contagions and the weakness of long ties. The American Journal of Sociology, vol. 113, Issue 3, pp. 702-734, 2007.

Centola, D., 2010 The spread of behavior in an online social network experiment. Science, vol. 329, Issue 5996, pp. 1194-1197, 2010.

Dodds, P., Watts, D., 2004, Universal behavior in a generalized model of contagion, Physical review letters, vol. 92, Issue 21, p. 218701 2004.

Pan, W., Aharony, N., Pentland, A., Aug. 2011, Composite social network for predicting mobile apps installation. Proceedings of twenty-fifth conference on artificial intelligence, AAAI '11, Association for the Advancement of Artificial Intelligence, Aug. 2011.

Banerjee, S., Mallik, S., Bose, I., 2004, Reaction diffusion processes on random and scale-free networks, Arxiv preprint cond-mat/0404640, (Apr. 27 2004).

Meloni, S., Arenas, A. Moreno, Y., 2009, Traffic-driven epidemic spreading in finite-size scale-free networks. Proceedings of the National Academy of Sciences of the United States of America, Oct. 2009, vol. 106, Issue 40, pp. 16897-16902.

Leskovec, J., Kleinberg, J., Faloutsos, C., Graphs over time: densification laws, shrinking diameters and possible explanations, in: Proceedings of the eleventh ACM SIGKDD international conference on Knowledge discovery in data mining, ACM Press, 2005, pp. 177-187. KDD '05 Proceedings of the eleventh ACM SIGKDD international conference on Knowledge discovery in data mining pp. 177-187 ACM New York, NY, USA.

* cited by examiner ial Application No. 61794218, filed Mar. 15, 2013, the entire disclosures of which are herein incorporated by reference.

METHODS AND APPARATUS FOR TUNING A NETWORK FOR OPTIMAL PERFORMANCE

RELATED APPLICATIONS

This application is a non-provisional of, and claims the benefit of the filing date of, United States Provisional Application No. 61/635,833, filed Apr. 19, 2012, and United States Provisional Application No. 61794218, filed Mar. 15, 2013, the entire disclosures of which are herein incorporated by reference.

STATEMENT REGARDING FEDERALLY SPONSORED RESEARCH OR DEVELOPMENT

This invention was made with U.S. government support under Army Research Laboratory Cooperative Agreement Number W911NF-09-2-0053 and Air Force Office of Scientific Research Grant Number FA9550-10-1-0122. The government has certain rights in this invention.

FIELD OF THE TECHNOLOGY

The present invention relates generally to networks.

BACKGROUND OF THE INVENTION

A cascade occurs in a network when nodes in a network copy behavior of other nodes in the network. This can occur, for example, in a peer-to-peer network.

SUMMARY OF THE INVENTION

In exemplary implementations of this invention, the performance of a network is optimized by adjusting network topology, as follows:

Cascade probabilities are computed for at least three different topologies of a network—a cascade probability for each network topology, respectively.

A computer calculates a correlation between these cascade probabilities and network performance for a specified task. For example, regression analysis may be used to compute the curve. The correlation may comprise a non-monotonous curve, including a curve with an inverse-u shape.

The computer also calculates an optimal cascade probability on the curve. For example, the optimal cascade probability may be the point on the curve where the network performance of the task is at a maximum. Alternatively, the computer may calculate a continuous segment of cascading probabilities on the curve, which segment includes the optimal cascade probability.

The computer solves an optimization problem to determine a change in the topology of the network that brings the cascade probability closer to the optimal cascade probability.

The computer outputs control signals to make the topological change, and to instruct an electronic communication device in the network to communicate the topological change to at least one electronic node device in the network.

Or, the computer outputs control signals to instruct an electronic communication device in the network to communicate an incentive for the topological change to at least one electronic node device in the network.

Or, the computer outputs an assessment of the expected level of performance of the current topology, or the distance of that level of performance from the best level of performance possible.

This process may be performed iteratively, so that as conditions internal or external to the network change, the network topology is automatically and dynamically adjusted to optimize cascade probability under changing conditions.

Consider the following example: In this example, the network is an electronic trading network and the task is trading in commodity futures. The network performance is measured by average return on investment for commodities futures trading by all traders using the network. Intuitively, the overall network performance in this task (commodities futures trading) may improve, at least in some cases, if the probability of cascades from more successful traders in the network to less successful traders in the network is increased—thereby, at least in some cases, increasing the probability that the less successful traders will copy successful behavior of their more successful peers. In this example, a computer may automatically make these changes in the links (topological changes). Or an incentive may be provided to the less successful traders to make these links themselves. For example, the incentive may be a $20 "coupon", which a less successful trader can use if he or she copies a behavior of the more successful trader.

However, in this example, some of the more successful traders may have been using a strategy that no longer works in rapidly changing market conditions, in which case having too many links may actually reduce network performance, because less successful traders may rush to copy behavior before it has been tested under changed market conditions. In this example, it is preferable to dynamically and iteratively adjust network topology to optimize the cascade probability of the network, according to principles of this invention.

The description of the present invention in the Summary and Abstract sections hereof is just a summary. It is intended only to give a general introduction to some illustrative implementations of this invention. It does not describe all of the details of this invention. This invention may be implemented in many other ways.

DETAILED DESCRIPTION

Figure 1:
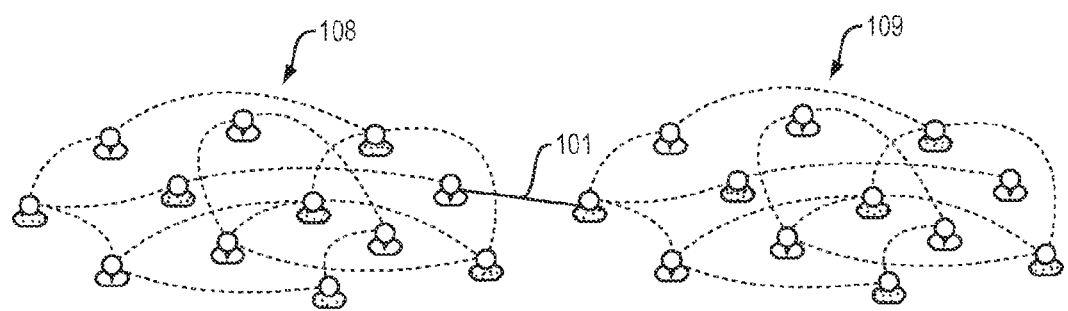
FIG. 1 shows a network in which two halves of the network are joined by only one link.

First, a few definitions and clarifications to get started. As used herein:

A "cascade" can occur when at least one node in a network copies behavior of another node in the network (e.g., either entirely or partially, either all of the time, part of the time, or with some probability). Copying in a "cascade" may, for example, occur in a chain or in a branching tree. For example, if node 1 adopts behavior A, and node 2 copies behavior A from node 1, then a cascade has occurred. Or, for example, if node 1 adopts behavior A, node 2 copies behavior A from node 1, and nodes 3 and 4 copy behavior A from node 2, then a cascade has occurred. For purposes of the definition of cascade, the term "copying" includes a first node adopting behavior of second node after being exposed to that behavior of the second node, regardless of what causes that adoption of behavior.

The "topology" of a network means the structure of the links that join nodes of the network. The term "topology" includes the number of links, which pairs of nodes are connected to each other by a link, and the character of the links (e.g. the weight or direction of the link). The adjective "topological" shall be construed in like manner.

In exemplary implementations of this invention, a distributed learning, peer-to-peer network is automatically tuned for optimal performance by changing the network topology. For example, the network may be automatically tuned by (a) making changes to the network topology or (b) creating incentives for these changes to be made. A central computer (i) may output control signals to make the changes in network topology, or (ii) may create, delete or modify incentives for others to make the changes in network topology. A topological change may comprise adding a link or links, deleting a link or links, changing the character (e.g., weight or direction) of a link or links, or any combination of the above. For example, a personalized incentive may encourage a specific human user of a network to create a link to a specific other user of the network.

The peer-to-peer network may be adaptive to its environment, that is, it may use past experience to alter its operational behavior (e.g., sensing, reporting, response decisions, etc.) in order to obtain the best performance possible. The nodes of the peer-to-peer network may continually improve their performance by learning both from their own experience and from the experience of other nodes to which they are connected. In this network, the pattern of connections between nodes may affect learning performance and thus the overall performance of the network (as measured, for example, by the average performance of the network's nodes).

In illustrative embodiments of this invention, each node in a network is capable of adaptive learning. Each node is capable of copying the behavior of a connected node if the connected node appears to have found a behavior that succeeds in achieving a specified goal. New behavior strategies that are successful have a high likelihood of being copied from node to node.

An algorithm is used to calculate the probability of a cascade (in which nodes copy behavior from each other). Based on that calculation, connections in the network are adjusted in order to optimize the performance of the network as a whole in achieving that goal. The optimal tuning may depend, in part, on the likelihood that the behavior being copied actually does succeed at the specified goal. The higher the uncertainty, the less rapidly the behavior cascades, in order to achieve optimal tuning.

Here are two non-limiting examples of how this invention may be implemented:

EXAMPLE 1

Cybersecurity

In Example 1, a peer-to-peer network with "smart" nodes is under constant and changing cyberattack. Each time, a node may (1) choose an existing defensive strategy, (2) invent a new strategy, or (3) copy an (apparently successful) strategy used by a node that it is connected to.

In this example, the attacks are from a distribution of attack methods, thus it is impossible to tell if repelling a particular attack was due to luck or due to selecting the right defense strategy. Moreover even if over some period of time a defense strategy is consistently successful, continual, slow changes in the distribution of attacks may render the strategy useless in the next instant.

In this example, topology of the network is controlled so that the entire ensemble of nodes has the best set of defense strategies against attacks as follows: Connections within the network are added or subtracted in real time, in order to alter the rate of flow of new strategies in the network (where the flow is due to copying strategies along connections). A computer selects exactly which connections to modify. In this manner, the network is "tuned" for best performance against cyberattack.

EXAMPLE 2

Finance

In Example 2, the nodes are people engaged in currency market (forex) trading in a peer-to-peer network, and the strategies are trading strategies rather than cyberattack defense strategies. Again, connections between people are added or subtracted in real time to control the rate of spread for trading strategies, and thus tune the network to obtain the best profitability for all the traders.

For an intuition of how this invention works, consider the four examples of network connections shown in FIGS. 1-4:

In FIG. 1, there is only one connection 101 between the two halves 108, 109 of a network. Thus, new strategies discovered in one half of the network 108 will spread to the other half 109 very slowly. In an environment that is quickly changing, this slow rate of adaptation can hurt the average performance of the network.

Figure 2:
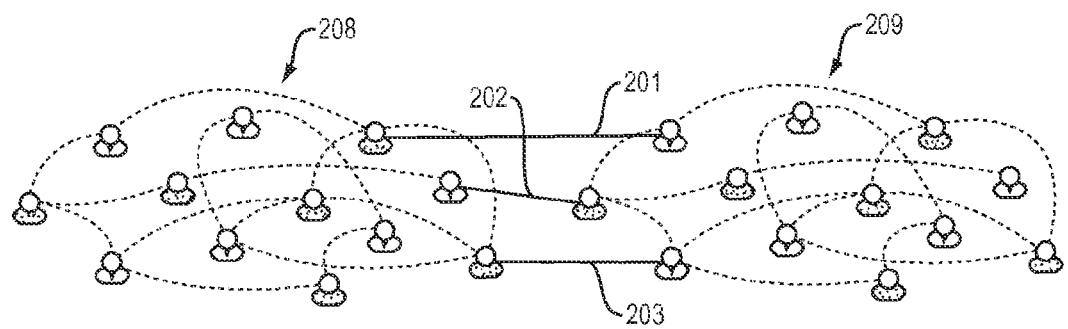
FIG. 2 shows a network in which two halves of the network are joined by three links.

In FIG. 2, there are three connections 201, 202, 203 between the two halves 208, 209 of a network. New strategies will spread more quickly as there are more connections between the two halves. Thus the cascades are more likely to become larger and grow faster, and in a highly variable environment this can improve the performance of the network.

Figure 3:
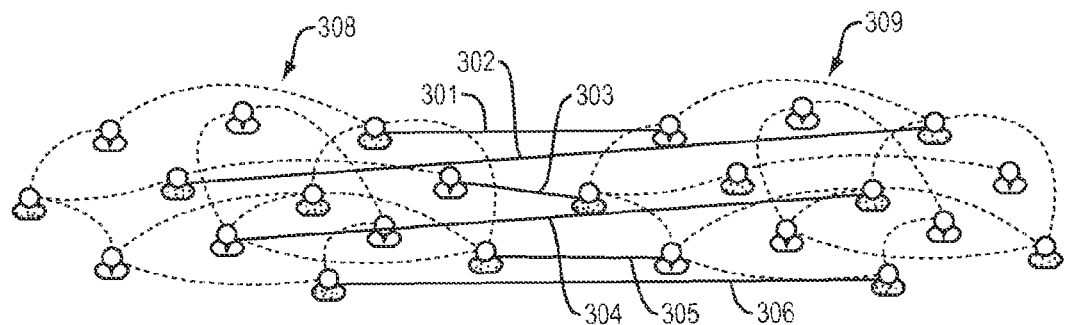
FIG. 3 shows a network in which two halves of the network are joined by six links.

In FIG. 3, there are six connections 301, 302, 303, 304, 305, 306 between the two halves 308, 309 of a network. As the number of interconnections increases, eventually a point is reached where "loops" in the network recirculate old strategies faster than new strategies are discovered. From this point on, adding more connections can hurt the performance of the network.

Figure 4:
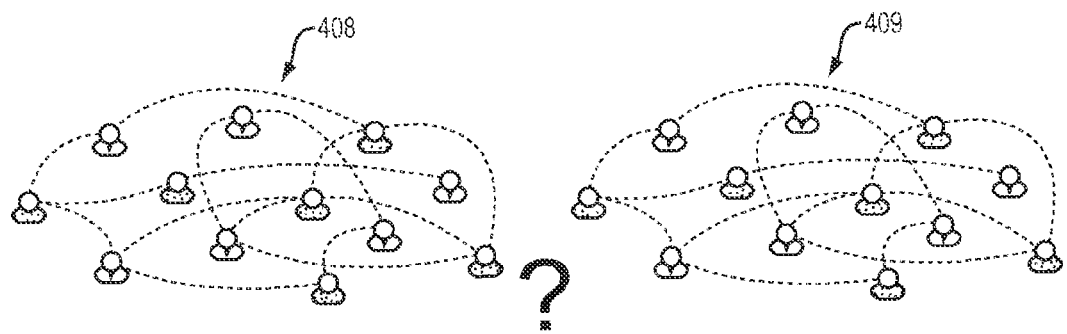
FIG. 4 shows a network in which the connections between two halves of the network are unknown, or the optimal connections have not yet been determined.

In FIG. 4, the connections between two halves of the network 408, 409 are unknown, or the optimal connections have not yet been determined. FIG. 4 illustrates the following question: What is the pattern of connections that optimizes the performance of the network? The exact pattern—not only number of connections but which connections—depends on, among other things, the node's learning parameters and the environment's rate of change. In exemplary implementations of this invention, a computer determines the optimal pattern of connections.

A cascade probability of an existing network structure may be calculated. Also, an optimal cascade probability (e.g., if connections are added or deleted) may be calculated.

A "cascade probability" is the probability of a specific event relating to a cascade in a network. For example, the specific event may be the occurrence of one or more of the following: (a) a specified number or percentage of nodes have been exposed to a particular behavior of other nodes; (b) a specified number or percentage of nodes have exposed or are exposing other nodes to a particular behavior, (c) a specified number or percentage of nodes have adopted a particular behavior after being exposed to the particular behavior, (d) a specified total number of cascades; (e) a specified total number of nodes involved in cascades, (f) a specified maximum or average number of cascades in a temporal period, (g) a specified maximum or average length of (number of nodes in) a cascade; (h) a specified maximum or average temporal length of a cascade; or (i) a specified change, rate of change or acceleration in change of any of the foregoing. A cascade probability is also known as a "cascading probability".

Figure 5:
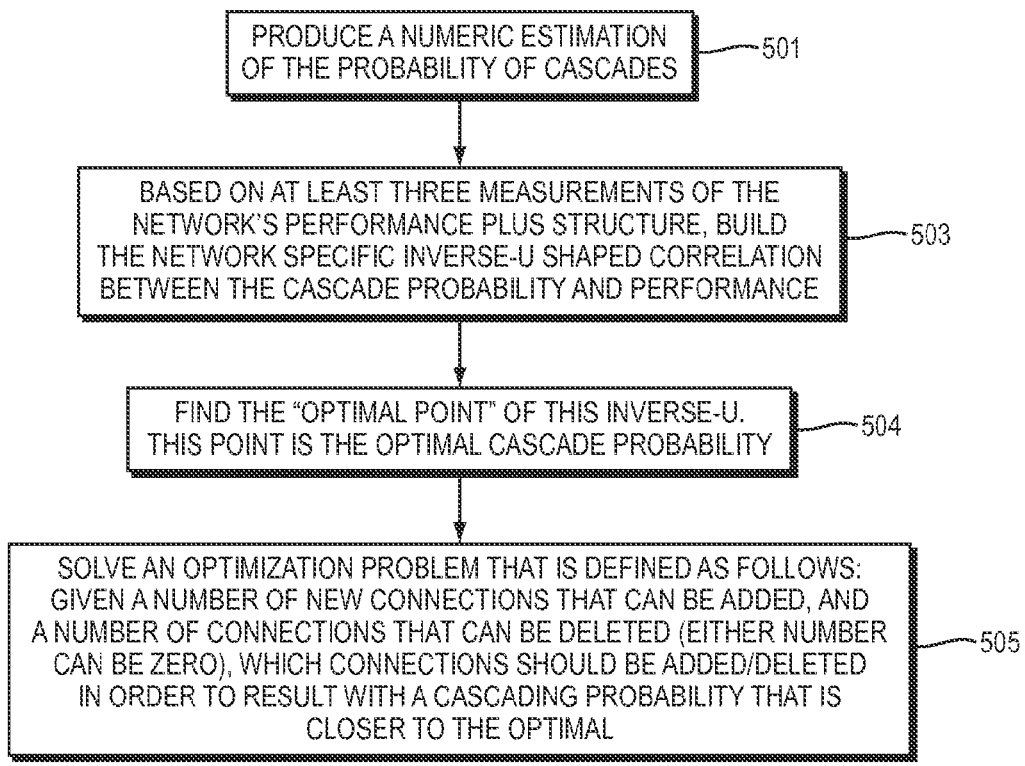
FIG. 5 is a high level description of an algorithm that may be used to determine how to tune a network.

FIG. 5 is a high level description of an algorithm that may be used to determine how to tune a network. The algorithm comprises the following steps: (1) Produce a numeric estimation of a cascade probability for a network 501. For example, Equation 1 or 2 below may be used to estimate the cascade probability. (2) Based on at least three measurements of the network's performance plus structure, build the network specific inverse-u shaped correlation between the cascade probability and performance 503. (3) Find the "optimal point" of this inverse-u curve—e.g., the maximum value for performance on the curve. This point is the optimal cascade probability 504. (4) Solve an optimization problem that is defined as follows: given a number of new connections that can be added, and a number of connections that can be deleted (either number can be zero), which connections should be added\deleted in order to result with a cascading probability that is closer to the optimal cascade probability 505.

In step 2 of this algorithm 503, the inverse-u correlation is calculated. For example, the correlation may be in the form of a "scatter plot", namely—a collection of points on a chart, whose X value represents the cascade probability, and whose Y value represents the performance. A wide range of regression methods (including any standard regression method, including any numeric or analytic method) may be used in order to find the curve.

The inverse u correlation produced by the regression formula may be described by a variety of different mathematical formulas. For example, $Y=aX^02+bX+c$ can produce an inverse u shaped graph, where a<0.

This invention is not limited to a context in which a computed correlation between cascade probabilities and levels of network performance has (if graphed with cascade probability as the X axis and level of network performance as the Y axis) a conventional inverse u shape (e.g., similar to the shape of the mathematical symbol for intersection of two sets). For example, this invention also applies, mutatis mutandis, where, by switching axes, what would otherwise be an inverse u shape is instead a C shape, inverse C shape, or U shape. Also, for example, this invention applies, mutatis mutandis, where the orientation of the curve is altered by (i) defining the task in a negative rather than a positive fashion (or vice versa), or (ii) defining numeric values indicative of levels of network performance so that they decrease rather than increase upon a certain change in such performance (or vice versa).

Nor is this invention limited to an inverse u shape at all. The curve may have (if graphed) a different shape that is not any variant of an inverse u shape.

The optimization problem in Step 4 of this algorithm 505 can be solved using a wide variety of optimization methods. For example, a greedy algorithm may be used that (1) places the new edges one by one where they would generate the maximal increase (or alternately, decrease) in the cascading probability and (2) then removes edges, one by one, according to the same logic. Or, for example, for a small network, an exhaustive search may be performed for an optimal assignment of edges. Or, for example, standard methods from artificial intelligence (AI) may be used, including "hill climbing" or "simulated annealing"—starting with a random assignment, and trying to improve the efficiency of the assignment by repeatedly changing the assignment of a single (random) edge.

Figure 6:
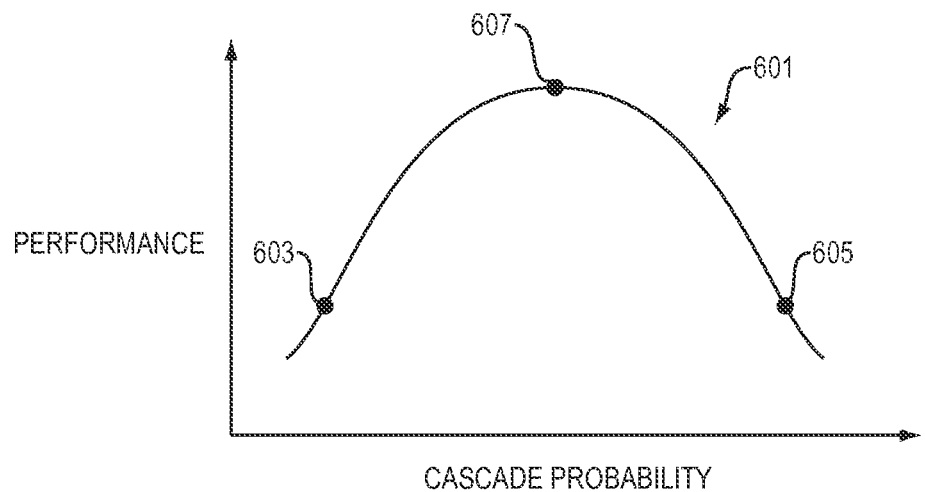
FIG. 6 shows an example of an inverse-u curve, which is calculated in the algorithm described in FIG. 5.

FIG. 6 shows an example of an inverse-u curve 601, which is calculated in the above algorithm 503. The optimal cascade probability occurs at approximately point 607. At this point, performance is maximized. Other points on the curve are not optimal for performance. For example, at point 603, the cascade probability is lower than at point 607, producing a suboptimal performance. Or, for example, at point 606, the cascade probability is higher than at point 607, also producing a suboptimal performance.

Figure 7:
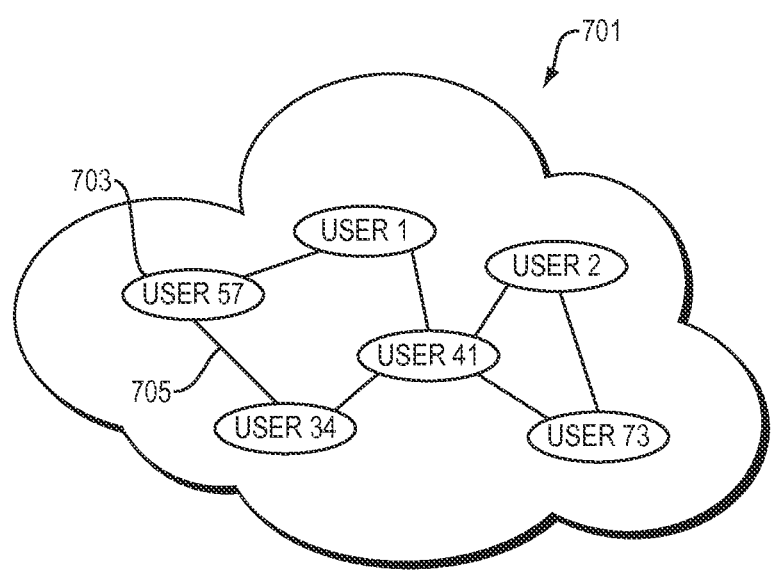
FIG. 7 shows an example of a network that can be tuned, using this invention.

FIG. 7 shows an example of a network that can be tuned, using this invention. The network 701 comprises a set of nodes (e.g., node 703). Pairs of nodes may be connected through an edge, also called a link (e.g., link 705) Links can be directed or undirected Links may or may not contain one or more types of additional information (such as weights, score, time stamp, and the like). Quantity, identification and composition of members, as well as edges configuration may be static or dynamic over time. The network is a peer-to-peer network. (As used herein, a network may be "peer-to-peer" even in some functions are performed by a server or stable host, and not by other nodes in the network).

In exemplary implementations of this invention, a central computer outputs control signals to cause incentives to be offered, stopped or changed. The incentives encourage nodes in the network to make changes in topology of the network. For example, the incentives may incentivize a first human user of the network (who is a first node in the network) to add a link, delete a link, or change the character of a link, in each case to a second human user of the network (who is a second node in the network). For example, the incentives may comprise personalized ranking, recommendation system, matchmaking, ease-of-access, social incentives, or financial incentives.

Figure 8:
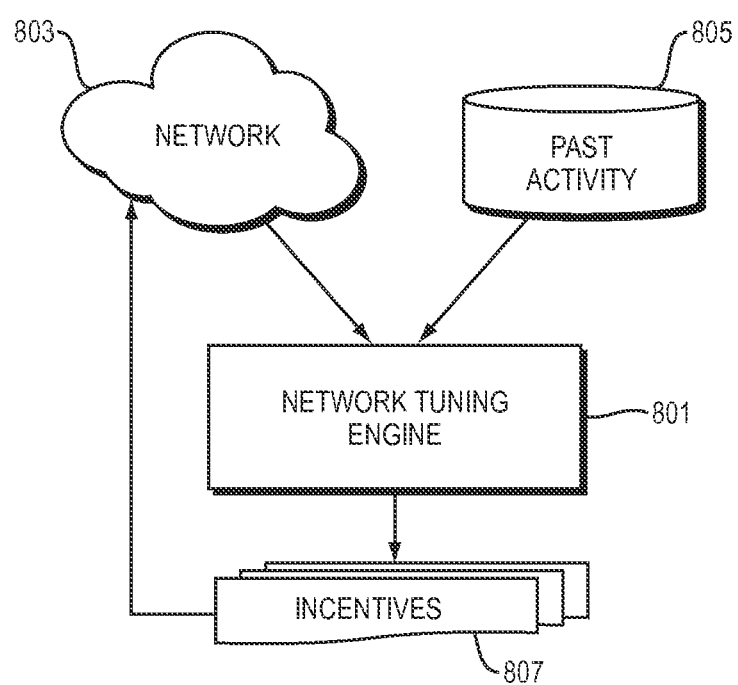
FIG. 8 shows a network tuning engine.

FIG. 8 shows a network tuning engine. The network tuning engine 801 receives as input data regarding network topology (e.g. a list of edges) 803, and data regarding some past activity of the network's members 805, and outputs control signals to begin, end or modify personalized incentives 807. The incentives are then sent (or presented, displayed, imposed and the like) to the network's users, or members. The incentives have a non-negligible probability of producing a change in the topology of the network (e.g., in the number, position or character of the network's edges).

The incentives may take various forms (recommendations, ranking, financial offers, and so on). Preferably, the incentives are personalized (vary depending on the particular node or user), network oriented, and network affected. For example, preferably: (a) Different incentives are given to (or displayed to, imposed upon, receive by and the like) to at least two members; (b) The incentives have a non-negligible probability of causing some alteration of the topological structure of the edges of the network (either explicitly or implicitly), by increasing the probability that new edges will be created, or that existing edges will be canceled (or alternatively, strengthen or weaken edges); and (c) In some cases, the incentives generation algorithm may change its decision regarding member A (namely, decide to generate an incentive, stop generating an incentive, or modifying an existing incentive concerning member A) as a result of changes in the network that do not directly concern or caused by any activity, lack or activity, property or behavior of member A.

Figure 9:
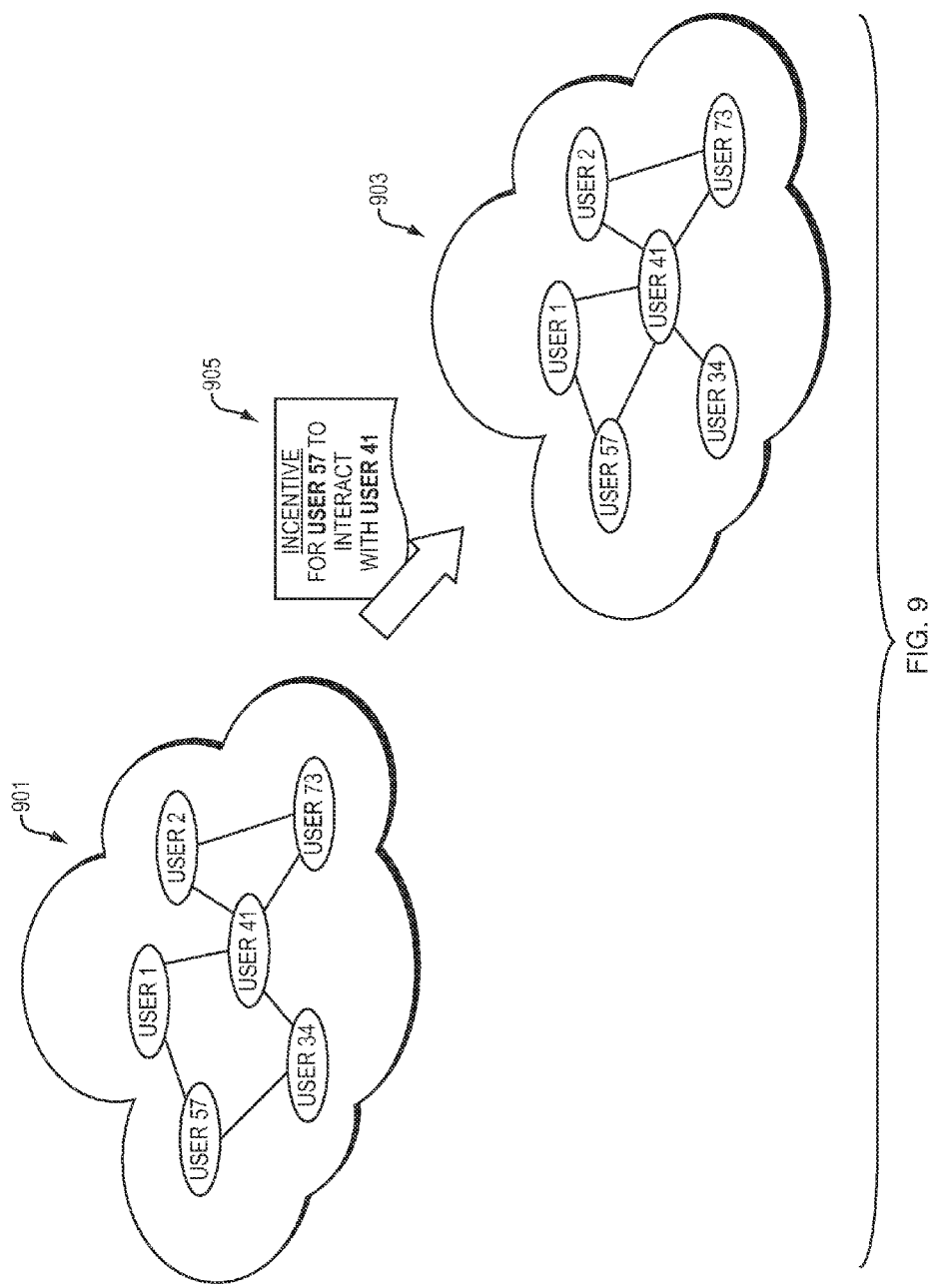
FIG. 9 shows an incentive for a user of the network to interact with another user of the network.

FIG. 9 shows an incentive for a user of the network to interact with another user of the network. In FIG. 9, an incentive 905 is given for User 57 to interact with User 41. In FIG. 9, two states of the network are shown: before 901 and after 903 the incentive. The incentive 903 results in a change of the network topology: Before the incentive, User 57 is linked to Users 1 and 34, not to User 41. After the incentive, User 57 is linked to User 1 and User 47, not to User 34.

For example, the incentives may comprise financial incentives (money or money-equivalent, discount coupons or any other type of coupons, and the like), social influence, recommendation, ranking, ease of access, visual emphasis, matchmaking, group, server or team assignment, and the like. For example, the incentive may comprise an electronic "coupon" that gives a network user $20 if the network user copies financial trades of another member of the network (whose trades have been more successful in the past). The incentives may be "generic" (not specific to a particular network or activity or member) or alternatively relate to a particular type or member(s), network(s), activity(ies), time(s), location(s), and so on.

The performance that is optimized may be of any task. The task may be performed entirely on the network. For example, the task may be trading commodities futures on an electronic trading platform, and the level of performance may be measured by a numeric value indicative of return on investment. Alternately, the task may be performed only partially or not at all on the network, but the level of performance of the task is reported to a computer on the network.

In exemplary implementations of this invention, the level of performance (e.g., return on investment in commodities trading) is quantified by a numeric value, which numeric value is indicated by electronic data.

For example, the task (whose performance is being optimized) may be an activity, at least a portion of which occurs electronically through a computing device (including a personal computer, laptop, smart phone, tablet computer, or cell phone). A group of at least two network members may take part in this activity, and the members of the group may have, at least at some times, an opportunity to interact and convey information between them, either explicitly or implicitly. The network members in the group may all be human users or one of these network members may be virtual or simulated by the system.

For example, the task (whose performance is being optimized) may comprise a task on or in a financial investment platform, social financial investment platform, copy- or co-investment platform, collaborative problem solving platform (both human based and machine based), e-commerce platform, social network, professional network, search engine (e.g., that relies on collaborative filtering, or deduces information from social interactions), computer game, on-line game, multi-player on-line game, persistent on-line or other computer game, game featuring short matches, single player game, automatic player game or game featuring at least one "bot" as a player, anonymous match, simulation software which involves at least two players or teams, or software related to the operation of casinos or games of chance and the like.

Figure 10:
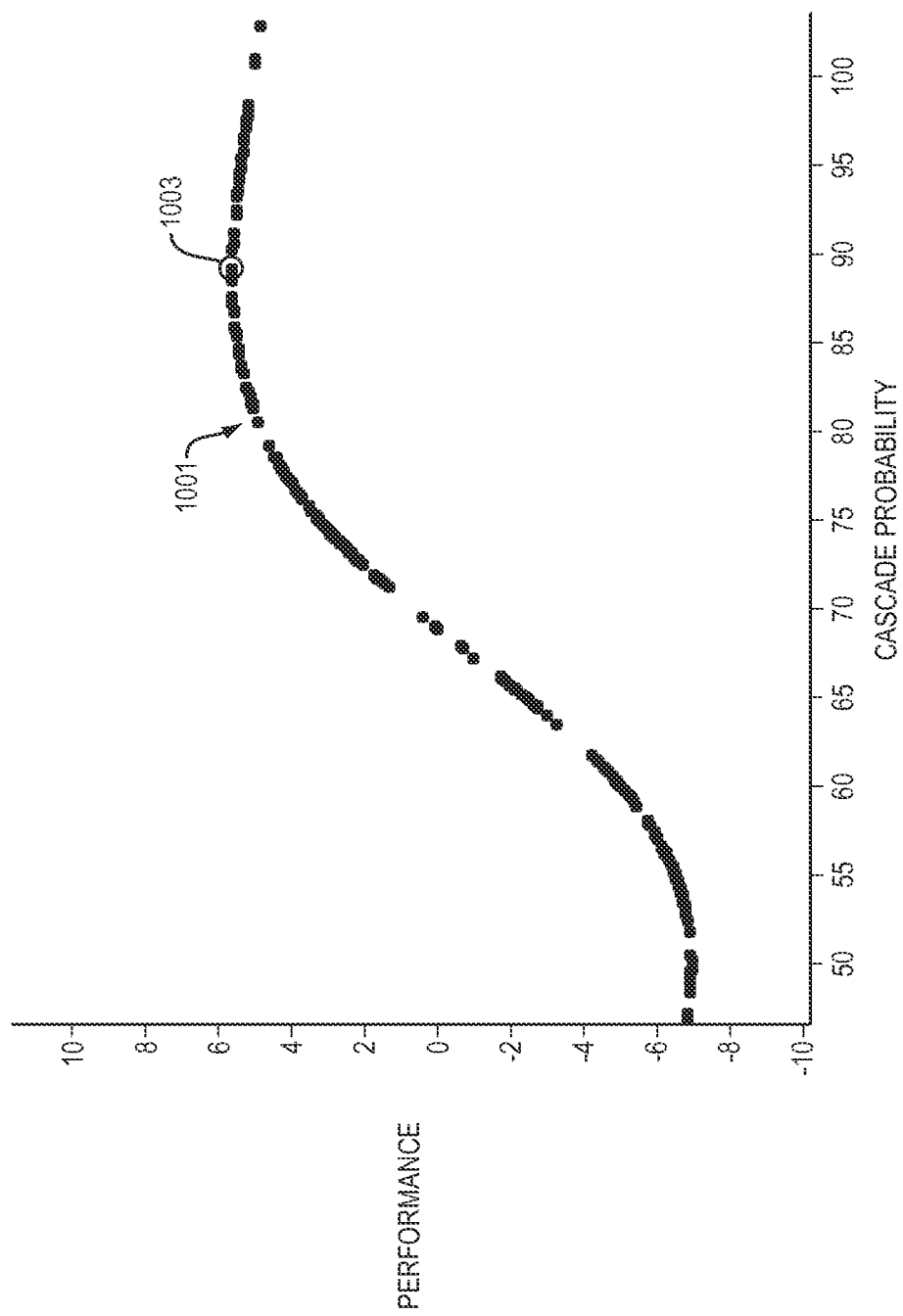
FIG. 10 is a chart that shows a correlation between performance and cascade probability of a network.

FIG. 10 is a chart that shows a correlation between performance and cascade probability of a network. The cascade probability which optimizes performance of a specified task occurs at approximately point 1003 of the performance/cascade probability curve 1001. This curve 1001 has an inverse u shape.

Figure 11:
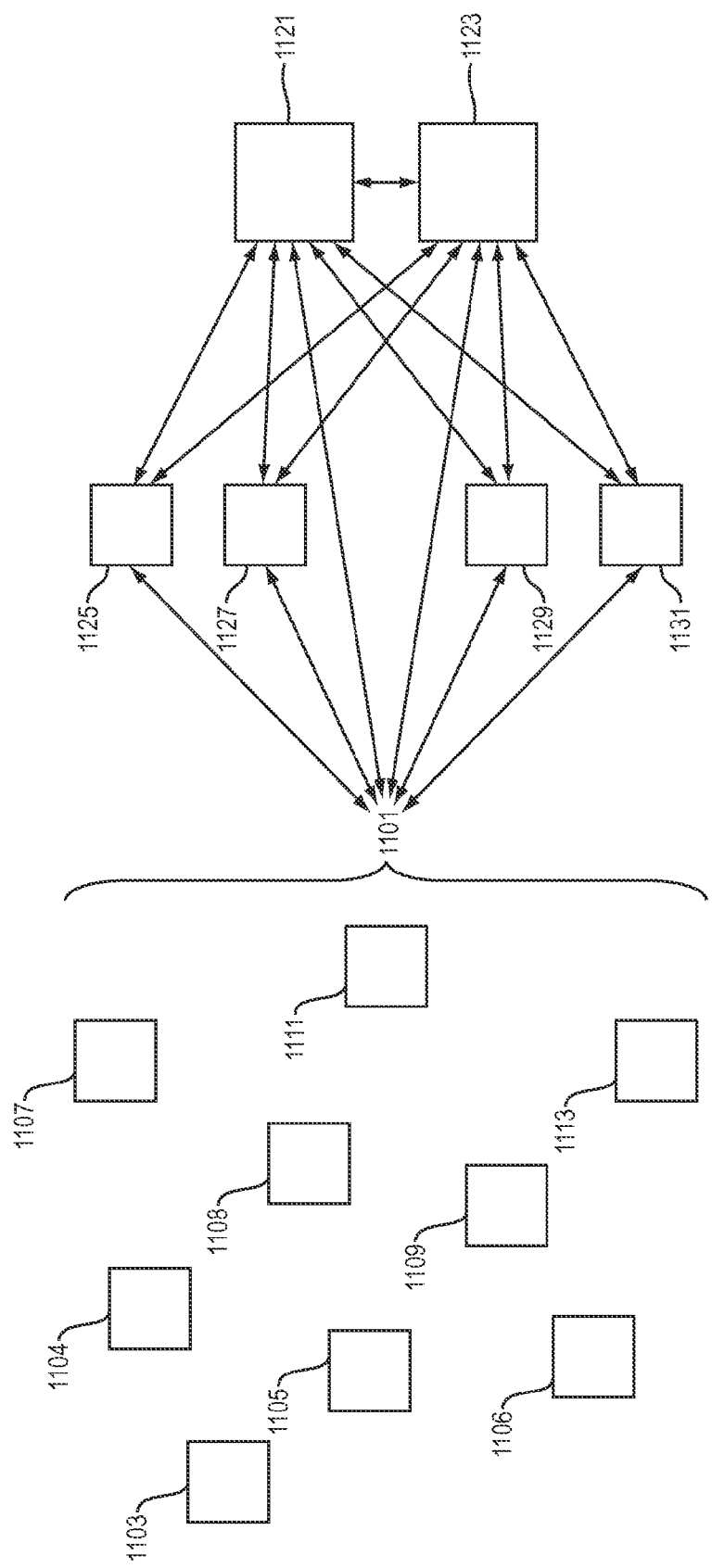
FIG. 11 is a high level block diagram showing hardware in an illustrative implementation of this invention The above Figures show some illustrative implementations of this invention, or provide information that relates to those implementations. However, this invention may be implemented in many other ways. The above Figures do not show all of the details of this invention.

FIG. 11 is a high level block diagram showing hardware in an illustrative implementation of this invention. A physical network 1101 comprises electronic node devices (e.g. 1103, 1104, 1105, 1106, 1107) and other electronic hardware components (e.g., 1108, 1109, 1111, 1113). The physical network gathers network data, including data regarding (i) connections between nodes, (ii) communications over the network, including between or from nodes, (iii) cascading, and (iv) success or failure in achieving a goal. One or more computer processors (e.g., 1121, 1123) may (i) process the data, (ii) perform calculations, including calculations of cascading probability and optimization calculations, and (iii) output signals to control aspects of the network, including adding, deleting or modifying connections in the network or creating, deleting or modifying incentives presented through the network. The processors are linked to electronic hardware components (e.g., 1125, 1127, 1129, 1131). The other electronic components may be in the physical network (e.g. 1108, 1109, 1111, 1113) or outside of the physical network (e.g. 1125, 1127, 1129, 1131). The components that are in the physical network may include electronic communication devices, including routers. In the example shown in FIG. 11, signals are sent over at least some portions of the physical network, including in some cases to at least a subset of nodes or users.

In FIG. 11, each of the node devices, electronic components and computer processors may be linked, including by a wired or wireless connection, with any one or more other devices. The one or more computer processors may be arranged in any physical or network configuration, including at a distance from each other or at a distance from the network.

Two Examples of Computing Cascade Probability

In exemplary implementations of this invention, a cascade probability for a given network topology is calculated.

Equations 1 and 2 below are two examples of how a cascade probability may be calculated. These two equations are based on an adoption model (i.e., modeling individuals' behavior based on the social signals to which they are exposed). Using these two equations, a central computer may predict the likelihood that an anomalous network pattern will spread and become a "trend". These two equations may be used to solve the following problem: Given a snapshot of a social network with some behavior occurrences (i.e. an emerging trend), what is the probability that these occurrences (seeds) will result in a viral diffusion and a widespread trend (or alternatively, dissolve into oblivion). These two Equations are based on a model in which diffusion in a scale-free network is decomposed to a transitive random walk of "exposure agents".

For purposes of Equations 1 and 2 below, the following definitions (including Math Definitions 1-10, below), assumptions and models apply:

Model the community, or social network, as a graph G, that is comprised of V (the community's members) and E (social links among them). Use n to denote the size of the network, namely |V|. In this network, we are interested in predicting the future behavior of some observed anomalous pattern a. For example, a can be a growing use of some new web service, or alternatively a behavior such as associating oneself with a political movement.

"Exposures" to trends are transitive. Namely, an "exposing" user generates "exposure agents" which can be transmitted on the network's social links to "exposed users", which can in turn transmit them onwards to their friends, and so on. Exposure interactions are modeled as movements of random walking agents in a network, assuming that every user that was exposed to a trend a generates β such agents, on average.

Assume that the network is (or can be approximated by) a scale free network G(n, c, γ), namely, a network of n users where the probability that user v has d neighbors follows a power law~:

$$P(d) \sim c \cdot d^{-\gamma}$$

where both C and γ are constants.

Math Definition 1: Let $V_\alpha(t)$ denote the group of network members that at time t advocate the behavior associated with the potential trend a.

Math Definition 2: Denote by β>0 the average "diffusion factor" of a trend a. Namely, the average number of friends a user who have been exposed to the trend will be talking about the trend with (or exposing the trend in other ways).

Math Definition 3: Let $P_\Delta$ be defined as the probability that two arbitrary members of the network vertices have degrees ratio of Δ or higher:

$$P_\Delta \triangleq \text{Prob}[\deg(u) > \Delta \cdot \deg(v)].$$

Math Definition 4: Denote by $\sigma_-$ the "low temporal resistance" of the network:

$$\forall t, \Delta_t, \sigma_- \triangleq \max\left\{1 \leq \Delta \,\middle|\, 1 - e^{-\Delta \cdot \frac{\beta^{\Delta_t} \cdot |V_a(t)|}{n}} \cdot (1 - P_\Delta)\right\}$$

Math Definition 5: Let $P_{Local-Adopt}(\alpha, v, t, \Delta_t)$ denote the probability that at time $t+\Delta_t$ the user v had adopted trend α (for some values of t and $\Delta_t$). This probability may be different for each user, and may depend on properties such as the network's topology, past interactions between members, etc.

Math Definition 6: Let $P_{Local}$ denote that expected value of the local adoption probability throughout the network~:

$$P_{Local} = \underset{u \in V}{E}\left[P_{Local-Adopt}(a, u, t, \Delta_t)\right]$$

Math Definition 7: Denote by $P_{Trend}$ $$\left(\Delta_t, \frac{V_a(t)}{n}, \varepsilon\right)$$

the probability that at time $t+\Delta_t$ the group of network members that advocate the trend α has at least ε·n members (namely, that $|V_a(t+\Delta_t)| \geq \varepsilon \cdot n$).

Math Definition 8: Let $\mathcal{N}_{v,a}(t)$ denote the number of friends of user v that at time t are exposing v to the trend a (namely, the number of friends of v that at time t have been exposed to the trend a and are conveying this information to v). Note that "exposing" a neighbor to a trend does not necessarily mean advocating the same trend.

Math Definition 9: Denote by $P_{\rho\text{-}Trend}$ $$\left(\Delta_t, \rho, \frac{|V_a(t)|}{n}, \varepsilon\right)$$

the probability that at time $t+\Delta_t$ at least ε·n members of the network have been exposed to the trend a by at least ρ of their friends.

Math Definition 10: Let ϕ(x) denote the cumulative normal distribution function, defined as:

$$\Phi(x) = \frac{1}{\sqrt{2\pi}} \int_{-\infty}^{x} e^{-\frac{1}{2}t^2} \, dt$$

Assume that the seed group of members that advocate a trend at time t is randomly placed in the network.

At time t there are $|V_a(t)|$ members of the network that advocate trend a. Those members generate on average β "agents" that are sent along the social links to their friends, creating chains of length $\Delta_t$, and a total of $\beta^{\Delta_t} \cdot |V_a(t)|$ active agents.

Equation 1: For any value of $\Delta_t$, $|V_a(t)|$, n, ε, the probability that at time $t+\Delta_t$ at least ε portion of the network's users would advocate trend a is lower bounded as follows:

$$P_{Trend}\left(\Delta_t, \frac{|V_a(t)|}{n}, \varepsilon\right) \geq P_{Local}^{\varepsilon n}\left(1 - \Phi\left(\frac{\sqrt{n} \cdot (\varepsilon - \tilde{P}_-)}{\sqrt{\tilde{P}_- (1 - \tilde{P}_-)}}\right)\right) \quad \text{(Eq. 1)}$$

where:

$$\tilde{P}_- = e^{-\left(\frac{\Delta_t \cdot \sigma_-}{2} - \rho_{opt_-} + \frac{\rho_{opt_-}^2}{2\Delta_t \cdot \sigma_-}\right)}$$

and where:

$$\rho_{opt_-} \triangleq \operatorname{argmin}\left(P_{Local}^{\varepsilon n} \cdot P_{Trend}\left(\Delta_t, \frac{|V_a(t)|}{n}, \varepsilon\right)\right)$$

and provided that:

$$\rho_{opt_-} < \Delta_t \cdot \sigma_-$$

and as $\rho_-$ depends on $P_\Delta$, using the following bound:

$$\forall v, u \in V, P_\Delta \leq \frac{c^2 \cdot \Delta^{1-\gamma}}{2\gamma^2 - 3\gamma + 1}$$

Now consider local influence in the social network. For every member v∈V, $s_v \geq 0$ captures the individual susceptibility of this member, regardless of the specific behavior (or trend) in question. $p_a(v)$ denotes the network potential for the user v with respect to the trend a, and is defined as the sum of network agnostic "social weights" of the user v with the friends exposing him with the trend a. Notice also that both properties are trend-agnostic. However, while $s_v$ is evaluated once for each user and is network agnostic, $p_a(v)$ contributes network specific information and can also be used by us to decide the identity of the network's members that we would target in our initial campaign.

Using Equation 1, construct a lower bound for the success probability of a campaign, regardless of the specific value of ρ:

Equation 2. For every $\Delta_t$, $|V_a(t)|$, $n$, $\epsilon$, the probability that at time $t+\Delta$, at least $\epsilon$ portion of the network's users advocate the trend a is:

$$P_{Trend}\left(\Delta_t, \frac{|V_a(t)|}{n}, \epsilon\right) \geq \quad \text{(Eq. 2)}$$

$$e^{-\epsilon \cdot n \cdot \xi_G \cdot \xi_N^{\rho_{opt_-}}} \cdot \left(1 - \Phi\left(\sqrt{n} \cdot \frac{\epsilon - \tilde{P}_-}{\sqrt{\tilde{P}_-(1-\tilde{P}_-)}}\right)\right)$$

where:

$$\tilde{P}_- = e^{-\left(\frac{\Delta_t \cdot \sigma_-}{2} - \rho_{opt_-} + \frac{\rho_{opt_-}^2}{2\Delta_t \cdot \sigma_-}\right)}$$

and where:

$$\rho_{opt_-} \triangleq \underset{\rho}{\operatorname{argmin}}\left(e^{-\epsilon \cdot n \cdot \xi_G \cdot \xi_N^{\rho}} \cdot P_{Trend}\left(\Delta_t, \frac{|V_a(t)|}{n}, \epsilon\right)\right)$$

and provided that:

$$\rho_{opt_-} < \Delta_t \cdot \sigma_-$$

and where $\xi_G$ denotes the network's adoption factor and $\xi_N$ denotes the network's influence factor:

$$\xi_G = e^{-\frac{1}{n}\sum_{v \in V} s_v}, \xi_N = e^{-\frac{1}{n}\sum_{e(v,u) \in E}\left(\frac{w_{u,v}}{|N_v|} + \frac{w_{v,u}}{|N_u|}\right)}$$

This invention is not limited to using Equations 1 and 2. Any equation or algorithm for calculating a cascade probability may be employed.

Definitions and Clarifications:

Certain terms are defined or clarified above. In addition, here are a few more definitions and clarifications. As used herein:

The terms "a" and "an", when modifying a noun, do not imply that only one of the noun exists.

The term "behavior" shall be construed broadly. For example, the "behavior" of a node includes any activity or non-activity, or pattern of activity or non-activity, of the node. Also, for example, the "behavior" of a node includes any state of the node, including, in the case of a human user who is a node, any mental state, attitude, belief or conviction of the user.

The terms "calculation" and "computation" shall be construed broadly. For example, a "calculation" (or "computation") includes a calculation, computation, algorithm or estimation. The terms "calculate" and "compute" shall be construed in like manner. To calculate a value includes to compute an upper bound or lower bound for the value.

A "central computer" for a network can (i) for at least some functions, exercise some centralized control or coordination over the network, or (ii) provide a service that at least some other nodes in the network do not provide.

The term "comprise" (and grammatical variations thereof) shall be construed broadly, as if followed by "without limitation". If A comprises B, then A includes B and may include other things.

A "computer processor" is an electronic processor, including an electronic processor configured to perform computations. For example, a microprocessor or CPU is a computer processor.

The term "control signal" shall be construed broadly. For example, a "control signal" includes any signal outputted by a first device for controlling a second device. As used herein: (a) "control signals" are not limited to enable, clock, read/write or similar signals; and (b) a signal may be a "control signal" even if that signal includes or is indicative of data.

The terms "e.g." and "such as" mean for example.

"Exposure" to a behavior shall be construed broadly. For example, a first node is exposed to a behavior of a second node, if (i) electronic data indicative of the behavior is received by the first node, or (ii) information regarding the behavior is presented, displayed, conveyed or transmitted to the second node.

The term "electronic node device" shall be construed broadly. For example, an electronic node device in a network includes an electronic computing device which (i) comprises a node in a network, or (ii) is used or configured for use by a node in the network, as an interface to the network. Consider an example in which a human user is a node in the network: In that example, an electronic node device in the network includes an electronic computing device used, or configured for use, by the human user to interface with the network.

The term "electronic computing device" shall be construed broadly. For example, an "electronic computing device" includes a personal computer, laptop computer, tablet computer, smartphone, or cell phone.

The term "Equation One" means the equation identified as Equation 1 above and any equations that are similar to Equation 1.

The term "Equation Two" means the equation identified as Equation 1 above and any equations that are similar to Equation 1.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, a "fourth" thing and so on shall be construed in like manner.

The term "graph" shall be construed broadly. For example, a "graph" includes any kind of mathematical graph, including any abstract representation (or description) of a set of objects in which at least some pairs are connected by links. Also, for example, the term "graph" includes any simple graph, undirected graph, symmetric graph, directed graph, asymmetric graph, digraph, multigraph, pseudograph, mixed graph, oriented graph, finite graph, infinite graph, weighted graph, regular graph, complete graph, free-scale graph, random graph, unlabeled graph, vertex-labeled graph, edge-labeled graph, linear graph, bipartite graph, complete bipartite graph, tree, forest, cycle graph, conceptual graph, graphs that allow loops, graphs that allow multiple edges between two nodes, and graphs that include both loops and multiple edges between two nodes. The term "graph" is not limited to graphs that provide visual information (e.g., a diagram or chart) or to a physical network.

The term "include" (and grammatical variations thereof) shall be construed broadly, as if followed by "without limitation".

In the context of a network, the terms "link", "edge" and "connection" have the same meaning.

The term "or" is inclusive, not exclusive. For example "A or B" is true if A is true, or B is true, or both A or B are true. Also, for example, a calculation of "A or B" means a calculation of A, or a calculation of B, or a calculation of A and B.

The term "network" shall be construed broadly. For example, a "network" may comprise any graph or any physical network. Also, for example, a node in a network may comprise an electronic computing device or a human user. However, nodes in a network are not limited to humans or electronic computing device. A node in a network may be of any type.

Each of the following is an example of a "network level of performance" of a task: (i) a set of numeric values indicative of level of performance of the task by respective nodes of the network; or (ii) a numeric value indicative of (A) a measure of central tendency of the set, (B) a measure of spread of the set, (C) a maximum in the set, or (D) a minimum in the set.

A parenthesis is simply to make text easier to read, by indicating a grouping of words. A parenthesis does not mean that the parenthetical material is optional or can be ignored.

The term "peer-to-peer" network shall be construed broadly. It includes a network in which, for some but not all functions, the nodes of the network: (i) operate without central coordination (or control) by a server or stable host, and (ii) are equally privileged, equipotent participants in the functions. A network may be "peer-to-peer" even if some, but not all, functions are subject to central command or coordination or if some, but not all, services are provided by less than all of the nodes in the network. For example, a network may be "peer-to-peer" even if one or more central servers (i) calculate cascade probabilities for various network topologies, (ii) calculate a correlation between performance and cascade probability, (iii) determine an optimal cascade probability, and (iv) output control signals to control network topology or to control incentives to change network topology.

A first equation and a second equation are "similar" if and only if: (i) for the same problem, both equations have the same unique solution or both equations have the same multiple solutions; or (ii) one of the two equations includes all of the terms in the other equation, even if all or some of the terms are weighted differently by non-zero weights or exponentiated by different exponents. For example, the fact that a term in one equation appears in the other equation but is multiplied by a different non-zero value (which itself may be a function) would not cause the two equations to be dissimilar. Also, for example, the fact that an additional term appears in one equation but not in the other equation would not make the two equations dissimilar. For purposes of this definition of "similar" equations, solutions that are the same include solutions that converge to or approach as a limit the same value.

A list or description of multiple steps in a process does not imply, except to the extent that the context requires otherwise, that: (1) the steps occur in any particular order or sequence, including the order or sequence listed or described; (2) the steps occur only once; (3) the different steps occur the same number of times during the process, or (4) a particular step is applied to the same thing each time that the particular step occurs. For example, in FIG. 5, the step of computing a cascade probability may be done repeatedly for different network topologies during the optimization step, calculating a cascade probability for each different topology.

Grammatical variations of defined terms shall be construed in like manner as the defined terms. For example, if a verb is defined in one conjugation, then other conjugations of that verb shall be construed in like manner. Or, for example, if a noun is defined in one declension, then other declensions of that noun shall be construed in like manner. Or for example, the adjective "topological" shall be construed in like manner as the defined noun "topology".

Variations:

This invention may be implemented in many different ways. Here are some non-limiting examples.

In some implementations, this invention can be used by a financial institute to infer a latent social network by analyzing available trading information, and to predict market behavior by simulating "virtual users" or "virtual members" and "virtual recommendations" in the form of co-investment orders and the like.

In some implementations, this invention can be used to assign workers, participants or users or members to teams in a non-electronic environment (such as an office, a firm, an educational, or a military or law enforcement organization) and the like.

In some implementations, the present invention can be used to issue personalized incentives to users of public transportation systems, or car drivers, in order to influence the traffic patterns in a way which would generate desired network effects (e.g., to the network operator, to one or more classes of the network members or users, to one or more classes of non-network members, or as measured by some external reference system such as environmental considerations such as air quality, pollution, fuel consumption and the like).

In some implementations, this invention can be used to influence the behavior of the users or members by incentives that change the network's topology. For example, this invention can be used to increase or decrease the popularity (or dominance, or any other measure of success) of a given product, service or any other object, in the view of the network's members, through changes induced to the social network (in some probability) by incentives.

This invention is not limited to social networks, but may also be applied in other contexts. For example, this invention may be applied to any network in which a large amount of (complex) data is available, where valuable information is hidden within the larger collection of data. For example, the network may be a financial or investment system, real-world commerce, transportation system, intelligent transportation network, system used in urban and city planning, analysis or operation, organizational system, politics, or public media.

In some cases, the computers may solve an optimization problem in order to determine a change in the topology of the network that brings the cascade probability further away from (rather than closer to) the optimal cascade probability. For example, that approach may be used, in some cases, to degrade the performance of a network.

This invention may be implemented as a method comprising, in combination: (a) using one or more computer processors (i) to receive electronic data indicative of, or to compute (A) at least three different topologies of a network and (B) a level of network performance of a task for each of the at least three different topologies, (ii) to calculate a set of cascade probabilities, the set of cascade probabilities comprising a cascade probability for each of the different topologies, respectively, and (iii) to calculate a curve indicative of correlation between the levels of network performance and the cascade probabilities and to determine an optimal cascade probability, the optimal cascade probability being a cascade probability (or continuous segment of cascade probabilities) on the curve which optimizes level of network performance of the task, and (b) either (i) using at least one electronic communication device to communicate data indicative of an incentive for a topological change to at least one electronic node device of the network, or (ii) using the one or more computer processors to output control signals to make the topological change in the network and using at least one electronic communication device to communicate data indicative of the topological change to at least one electronic node device in the network; wherein the topological change makes or would if implemented make the cascade probability closer to the optimal cascade probability. Furthermore: (1) the curve may comprise an inverse-u curve; (2) the level of network performance may comprise a measure of central tendency of levels of performance of the task by respective nodes of the network; (3) the level of network performance may comprise a measure of spread of levels of performance of the task by respective nodes of the network; (4) the optimal cascade probability may maximize the level network of performance; (5) the optimal cascade probability may minimize the level of network performance; (6) the topological change may comprise adding at least one edge to the network; (7) the topological change may comprise removing at least one edge from the network; (8) the topological change may comprise changing character of at least one edge of the network; (9) the network may comprise a peer-to-peer network; (10) the network may comprise a social network; (11) the incentive may be communicated to at least one, but not all, electronic node devices in the network; (12) the topological change may comprise change to more than one edge in the network, and data indicative of different incentives for the topological change may be communicated to different electronic node devices in the network; (13) the incentive may comprise a financial incentive; (14) the incentive may comprise a ranking or a change in ranking; (15) the incentive may comprise ease of access, a change in ease of access, visual emphasis or a change in visual emphasis; (16) some but not all of the nodes in the network may be computer-simulated or virtual nodes; and (17) the one or more processors may use Equation One or Equation Two to calculate or to help calculate at least some of the cascade probabilities.

This invention may be implemented as an article of manufacture, which article of manufacture comprises one or more machine-readable, non-transitory, tangible media having instructions encoded thereon for one or more computer processors: (i) to receive electronic data indicative of, or to compute (A) at least three different topologies of a network and (B) a level of network performance for each of the at least three different topologies, respectively, (ii) to calculate a set of cascade probabilities, the set of cascade probabilities comprising a cascade probability for each of the different topologies, respectively, (iii) to calculate a curve indicative of correlation between the levels of network performance and the cascade probabilities and to determine an optimal cascade probability, the optimal cascade probability being a cascade probability (or continuous segment of cascade probabilities) on the curve which optimizes level of network performance, and (iv) to output electronic control signals, which electronic control signals are indicative of either (A) instructions to make a topological change in the network and instructions for at least one electronic communication device to communicate data indicative of the topological change to at least one electronic node device in the network, (B) instructions for at least one electronic communication device to communicate data indicative of an incentive for the topological change to at least one electronic node device of the network; wherein the topological change makes or would if implemented make the cascade probability closer to the optimal cascade probability.

20. A system comprising, in combination:
   (a) at least one electronic device; and
   (b) one or more computer processors;
   wherein the one or more computer processors are configured (i) to receive electronic data indicative of, or to compute (A) at least three different topologies of a network and (B) a level of network performance for each of the at least three different topologies, respectively, (ii) to calculate a set of cascade probabilities, the set of cascade probabilities comprising a cascade probability for each of the different topologies, respectively, (iii) to calculate a curve indicative of correlation between the levels of network performance and the cascade probabilities and to determine an optimal cascade probability, the optimal cascade probability being a cascade probability (or continuous segment of cascade probabilities) on the curve which optimizes level of network performance, and (iv) to output electronic control signals, which electronic control signals are indicative of either (A) instructions to make a topological change in the network and instructions for at least one electronic communication device to communicate data indicative of the topological change to at least one electronic node device in the network, (B) instructions for at least one electronic communication device to communicate data indicative of an incentive for the topological change to at least one electronic node device of the network; wherein the topological change makes or would if implemented make the cascade probability closer to the optimal cascade probability.

It is to be understood that the methods and apparatus that are described herein are merely illustrative applications of the principles of the invention. Numerous modifications may be made by those skilled in the art without departing from the scope of the invention.

What is claimed is:
1. A method comprising, in combination:
   (a) using one or more computer processors
      (i) to receive electronic data indicative of, or to compute (A) at least three different topologies of a network and (B) a level of network performance of a task for each of the at least three different topologies,
      (ii) to calculate a set of cascade probabilities, the set of cascade probabilities comprising a cascade probability for each of the different topologies, respectively, and
      (iii) to calculate a curve indicative of correlation between the levels of network performance and the cascade probabilities and to determine an optimal cascade probability, the optimal cascade probability being a cascade probability (or continuous segment of cascade probabilities) on the curve which optimizes level of network performance of the task, and
   (b) either
      (i) using at least one electronic communication device to communicate data indicative of an incentive for a topological change to at least one electronic node device of the network, or
      (ii) using the one or more computer processors to output control signals to make the topological change in the network and using at least one electronic communi- cation device to communicate data indicative of the topological change to at least one electronic node device in the network;

wherein (A) the topological change makes or would if implemented make the cascade probability closer to the optimal cascade probability, and (B) the level of network performance comprises a measure of central tendency of levels of performance of the task by respective nodes of the network.

2. The method of claim 1, wherein the level of network performance comprises a measure of spread of levels of performance of the task by respective nodes of the network.

3. The method of claim 1, wherein the level of network performance comprises a measure of spread of levels of performance of the task by respective nodes of the network.

4. The method of claim 1, wherein the optimal cascade probability maximizes the level network of performance.

5. The method of claim 1, wherein the optimal cascade probability minimizes the level of network performance.

6. The method of claim 1, wherein the topological change comprises adding at least one edge to the network.

7. The method of claim 1, wherein the topological change comprises removing at least one edge from the network.

8. The method of claim 1, wherein the topological change comprises changing character of at least one edge of the network.

9. The method of claim 1, wherein the network comprises a peer-to-peer network.

10. The method of claim 1, wherein the network comprises a social network.

11. The method of claim 1, wherein the incentive is communicated to at least one, but not all, electronic node devices in the network.

12. The method of claim 1, wherein:
(a) the topological change comprises changes to more than one edge in the network; and
(b) data indicative of different incentives for the topological change is communicated to different electronic node devices in the network.

13. The method of claim 1, wherein the incentive comprises a financial incentive.

14. The method of claim 1, wherein the incentive comprises a ranking or a change in ranking.

15. The method of claim 1, wherein the incentive comprises ease of access, a change in ease of access, visual emphasis or a change in visual emphasis.

16. The method of claim 1, wherein some but not all of the nodes in the network are computer-simulated or virtual nodes.

17. The method of claim 1, wherein the one or more processors use Equation One or Equation Two to calculate or to help calculate at least some of the cascade probabilities.

18. An article of manufacture, which article of manufacture comprises one or more machine-readable, non-transitory, tangible media having instructions encoded thereon for one or more computer processors:
(i) to receive electronic data indicative of, or to compute
(A) at least three different topologies of a network and
(B) a level of network performance for each of the at least three different topologies, respectively,
(ii) to calculate a set of cascade probabilities, the set of cascade probabilities comprising a cascade probability for each of the different topologies, respectively,
(iii) to calculate a curve indicative of correlation between the levels of network performance and the cascade probabilities and to determine an optimal cascade probability, the optimal cascade probability being a cascade probability (or continuous segment of cascade probabilities) on the curve which optimizes level of network performance, and
(iv) to output electronic control signals, which electronic control signals are indicative of either
(A) instructions to make a topological change in the network and instructions for at least one electronic communication device to communicate data indicative of the topological change to at least one electronic node device in the network,
(B) instructions for at least one electronic communication device to communicate data indicative of an incentive for the topological change to at least one electronic node device of the network;
wherein (1) the topological change makes or would if implemented make the cascade probability closer to the optimal cascade probability, and (2) the level of network performance comprises a measure of central tendency of levels of performance of the task by respective nodes of the network.

19. A system comprising:
(a) at least one electronic device; and
(b) one or more computer processors;
wherein the one or more computer processors are configured
(i) to receive electronic data indicative of, or to compute
(A) at least three different topologies of a network and
(B) a level of network performance for each of the at least three different topologies, respectively,
(ii) to calculate a set of cascade probabilities, the set of cascade probabilities comprising a cascade probability for each of the different topologies, respectively,
(iii) to calculate a curve indicative of correlation between the levels of network performance and the cascade probabilities and to determine an optimal cascade probability, the optimal cascade probability being a cascade probability (or continuous segment of cascade probabilities) on the curve which optimizes level of network performance, and
(iv) to output electronic control signals, which electronic control signals are indicative of either
(A) instructions to make a topological change in the network and instructions for at least one electronic communication device to communicate data indicative of the topological change to at least one electronic node device in the network,
(B) instructions for at least one electronic communication device to communicate data indicative of an incentive for the topological change to at least one electronic node device of the network; and
wherein (1) the topological change makes or would if implemented make the cascade probability closer to the optimal cascade probability, and (2) the level of network performance comprises a measure of central tendency of levels of performance of the task by respective nodes of the network.

* * * * *